(12) United States Patent
Graham et al.

(10) Patent No.: US 10,304,453 B2
(45) Date of Patent: May 28, 2019

(54) REAL-TIME HUMAN DATA COLLECTION USING VOICE AND MESSAGING SIDE CHANNEL

(71) Applicant: International Business Machines Corporation, Armonk, NY (US)

(72) Inventors: Scott W. Graham, Boulder, CO (US); Lior Luker, Tel Aviv (IL); Nitzan Nissim, Nes Ziona (IL); Brian L. Pulito, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/662,230

(22) Filed: Jul. 27, 2017

(65) Prior Publication Data

US 2019/0035392 A1 Jan. 31, 2019

(51) Int. Cl.
*G10L 15/30* (2013.01)
*G10L 15/22* (2006.01)
*G10L 25/78* (2013.01)

(52) U.S. Cl.
CPC ............ *G10L 15/22* (2013.01); *G10L 15/30* (2013.01); *G10L 25/78* (2013.01); *G10L 2015/223* (2013.01)

(58) Field of Classification Search
CPC ......... G10L 15/30; G10L 15/00; G10L 15/04; G10L 15/20; G10L 15/22; G10L 15/222; G10L 15/26; G10L 2015/22; G10L 2015/225; G10L 2015/228
USPC ..... 704/251, 231, 235, 255, 257, 270, 270.1
See application file for complete search history.

(56) References Cited

U.S. PATENT DOCUMENTS

| | | | |
|---|---|---|---|
| 5,001,710 A | 3/1991 | Gawrys et al. | |
| 6,101,241 A | 8/2000 | Boyce et al. | |
| 8,694,324 B2 | 4/2014 | Di Fabbrizio et al. | |
| 2003/0093419 A1* | 5/2003 | Bangalore | G01C 21/3664 |
| 2007/0043868 A1* | 2/2007 | Kumar | G06F 17/30707 |
| | | | 709/226 |
| 2011/0106617 A1 | 5/2011 | Cooper et al. | |
| 2013/0338998 A1 | 12/2013 | Freitas et al. | |
| 2017/0300899 A1* | 10/2017 | Balaga | G06Q 20/327 |

OTHER PUBLICATIONS

"List of IBM Patents or Patent Applications Treated as Related," Letter from Leslie A. Van Leeuwen, Dec. 18, 2017, 1 page.
Graham et al., "Real-Time Human Data Collection Using Voice and Messaging Side Channel," U.S. Appl. No. 15/844,693, filed Dec. 18, 2017, 28 pages.

* cited by examiner

*Primary Examiner* — Qi Han
(74) *Attorney, Agent, or Firm* — VanLeeuwen & VanLeeuwen; Richard A. Wilhelm

(57) ABSTRACT

An approach is provided in which an information handling system sends a request in audio format to a user over a voice channel requesting a user data set. The information handling system receives utterances from the user over the voice channel and determines that the utterances do not provide enough information to complete the requested user data set. In turn, the information handling system establishes a messaging channel with the user and sends a request in digital format to the user over the messaging channel to provide additional data to complete the user data set.

13 Claims, 7 Drawing Sheets

REAL-TIME HUMAN DATA COLLECTION USING VOICE AND MESSAGING SIDE CHANNEL

BACKGROUND

Business call centers have traditionally employed personnel (live agents) to support customer phone calls. Over time, computerized response systems have replaced the live agents in many areas, primarily to reduce cost. Computerized response systems may be simple or complex. A simple computerized response system is an automated attendant, which relies on dual-tone multi-frequency (DTMF) signaling to transfer callers to an extension without the intervention of an operator/receptionist. For example, an automated attendant may state "For sales, press 1, for service, press 2," and the automated attendant directs the customer's call based on which button the customer depresses on the customer's phone.

A slightly more sophisticated computerized response system is an interactive voice response (IVR) system. IVR systems allow callers to interact with a company's host system via a telephone keypad or by speech recognition. An IVR system captures a user's utterances (uninterrupted speech) and processes the speech accordingly. While capturing the user's utterances, the IVR system determine a user's "final utterance" by detecting a pause in the user's speech. For example, the IVR system may state "please provide your account number" and the IVR system captures the user's response of "123456 . . . " and detects the pause after "6." As such, the IVR system concludes that the user's answer is "123456."

BRIEF SUMMARY

According to one embodiment of the present disclosure, an approach is provided in which an information handling system sends a request in audio format to a user over a voice channel requesting a user data set. The information handling system receives utterances from the user over the voice channel and determines that the utterances do not provide enough information to complete the requested user data set. In turn, the information handling system establishes a messaging channel with the user and sends a request in digital format to the user over the messaging channel to provide additional data to complete the user data set.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
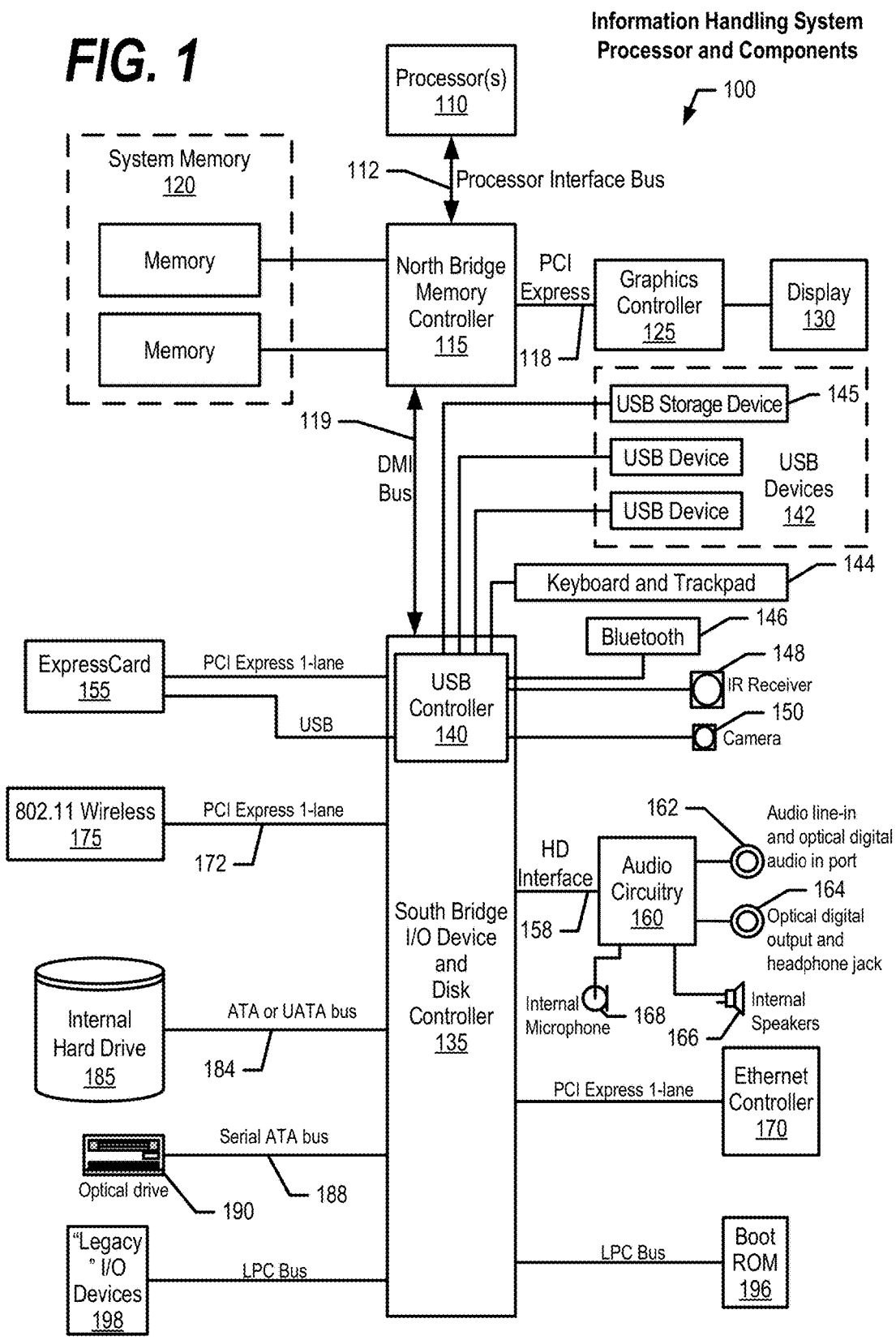
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, et cetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
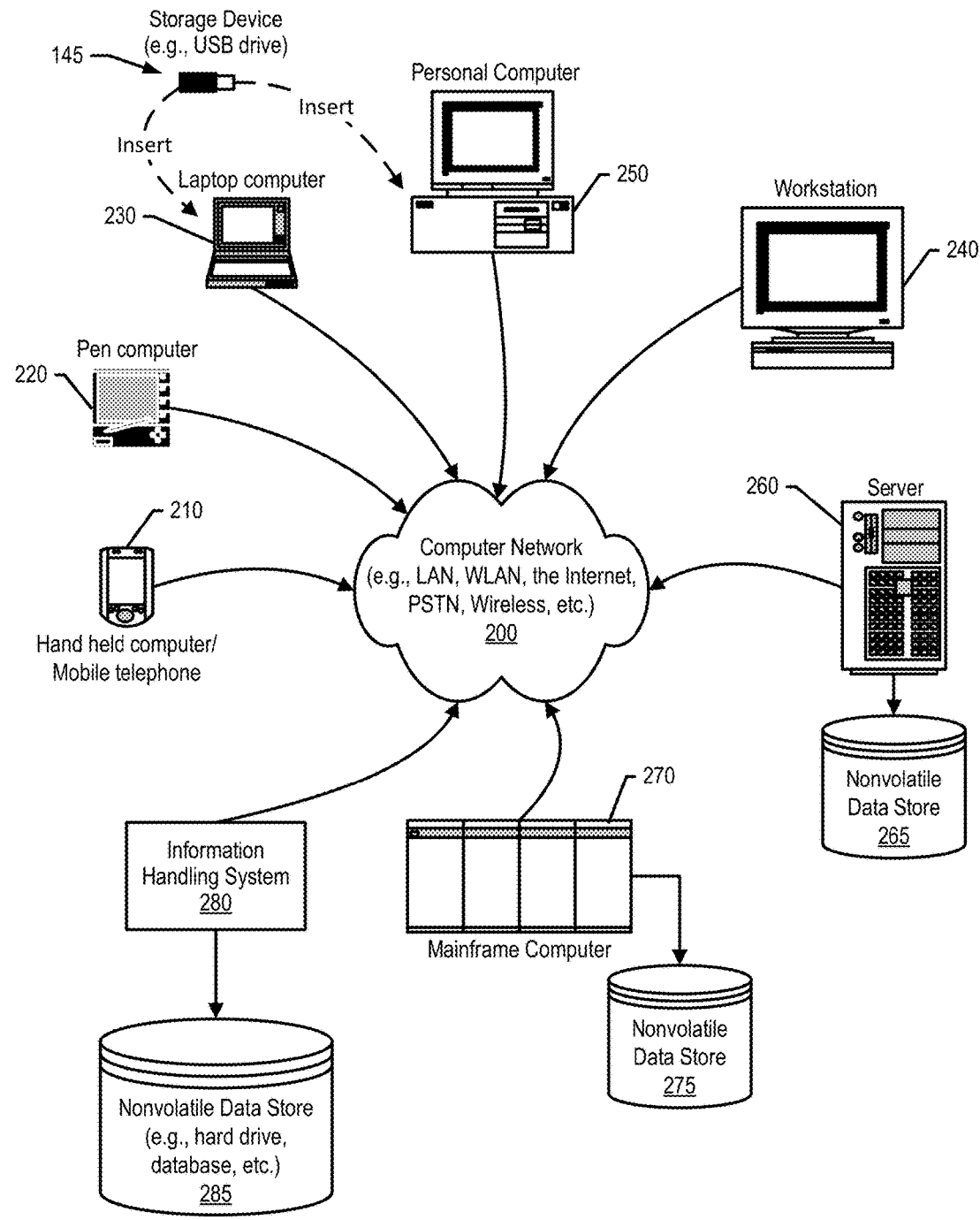
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 7 disclose an information handling system that provides a bridge between the public switched telephone network (PSTN) and cognitive self-service agents using a multi-channel approach to collect user data. Collecting complex utterances and converting them to contiguous strings of textual data such as credit card numbers from humans via a voice interface can be difficult for existing IVR systems. Existing IVR systems also have difficulty connecting information from users with heavy accent or over noisy voice channels. The information handling system described herein interacts with a user over a voice channel to collect user data and, when the interaction is not successful, the information handling system establishes a messaging channel to collect the user data from the user over the messaging channel. As discussed herein, a messaging channel is an end-to-end digital data channel that is limited to conveying characters and numbers, such as sending texts through a short messaging service (SMS) channel.

Figure 3:
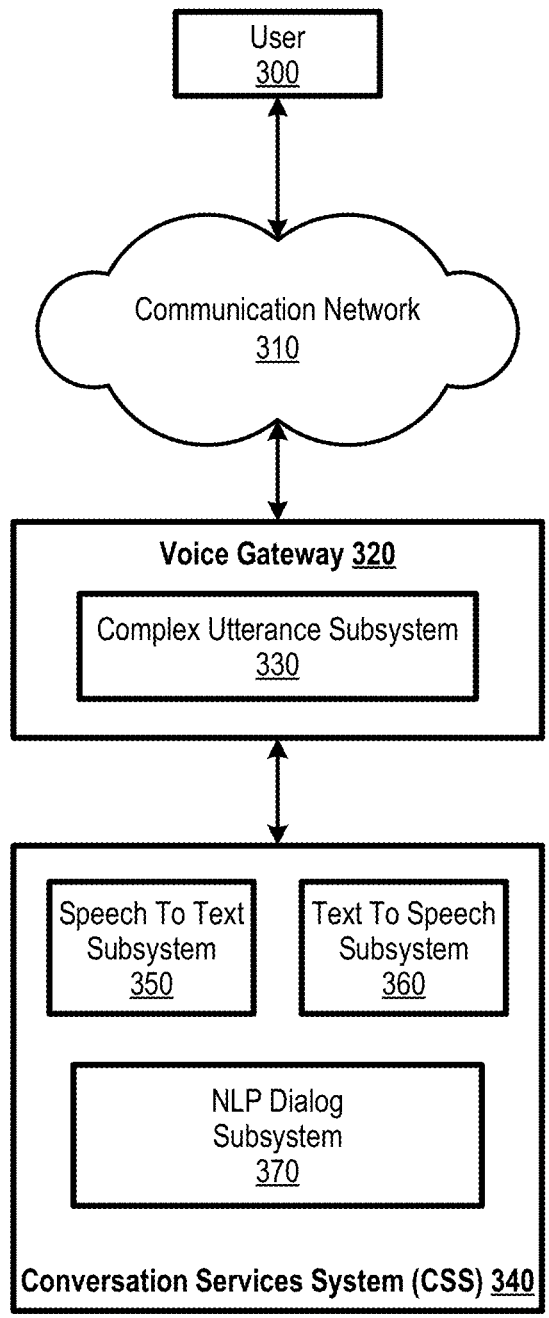
FIG. 3 is an exemplary diagram depicting a voice gateway system that receives utterances from a user over a public switch telephone network (PSTN) and intelligently provides the utterances to a conversation services system to process.

FIG. 3 is an exemplary diagram depicting a voice gateway system that receives utterances from a user over a public switch telephone network (PSTN) and intelligently provides the utterances to a conversation services system to process. Voice gateway 320, and particularly complex utterance subsystem 330, accounts for natural pauses in a caller's speech responses and allows for the collection of data to be controlled from a conversation API that has no knowledge of the complexities of conversation services system 340, which performs real-time orchestration. In addition, when a voice gateway 320 and conversation services system 340 are unable to accurately collect the user data, voice gateway 320 establishes an alternate messaging channel to collect the user data instead of transfer user 300 to a live agent (see FIG. 4 and corresponding text for further details).

User 300 initiates a call with voice gateway 320 over a voice channel through communication network 310. The voice channel may be established over the PSTN, over a Voice over IP session, and et cetera. Complex utterance subsystem 330 informs conversation services system 340 of the new voice session, and conversation services system 340 sends a request via text to speech subsystem 360 for user data to voice gateway 320. In turn, voice gateway 320 sends the request in audio format to user 300 over the voice channel. User 300 responds with speech to answer the request, which complex utterance subsystem 330 begins capturing.

Content is streamed to Speech To Text (STT) subsystem 350 and when STT subsystem 350 detects a pause in speech it returns a text utterance to complex utterance subsystem 330, which is then passed on to NLP dialog subsystem 370. NLP dialog subsystem 370 analyzes the text and conversation services system 340 informs complex utterance subsystem 330 that the captured utterance does not yet provide a complete set of data. In turn, complex utterance subsystem 330 sets a timer to wait for the next utterance from user 300. User 300 speaks another utterance within the time limit and complex utterance subsystem 330 provides the additional utterances to conversation services system 340 for processing. However, when user 300 does not provide the additional data in the time allowed, conversation services system 340 may instruct complex utterance subsystem 330 to open a messaging channel with user 300 to collect the additional data (see FIG. 4 and corresponding text for further details).

Figure 4:
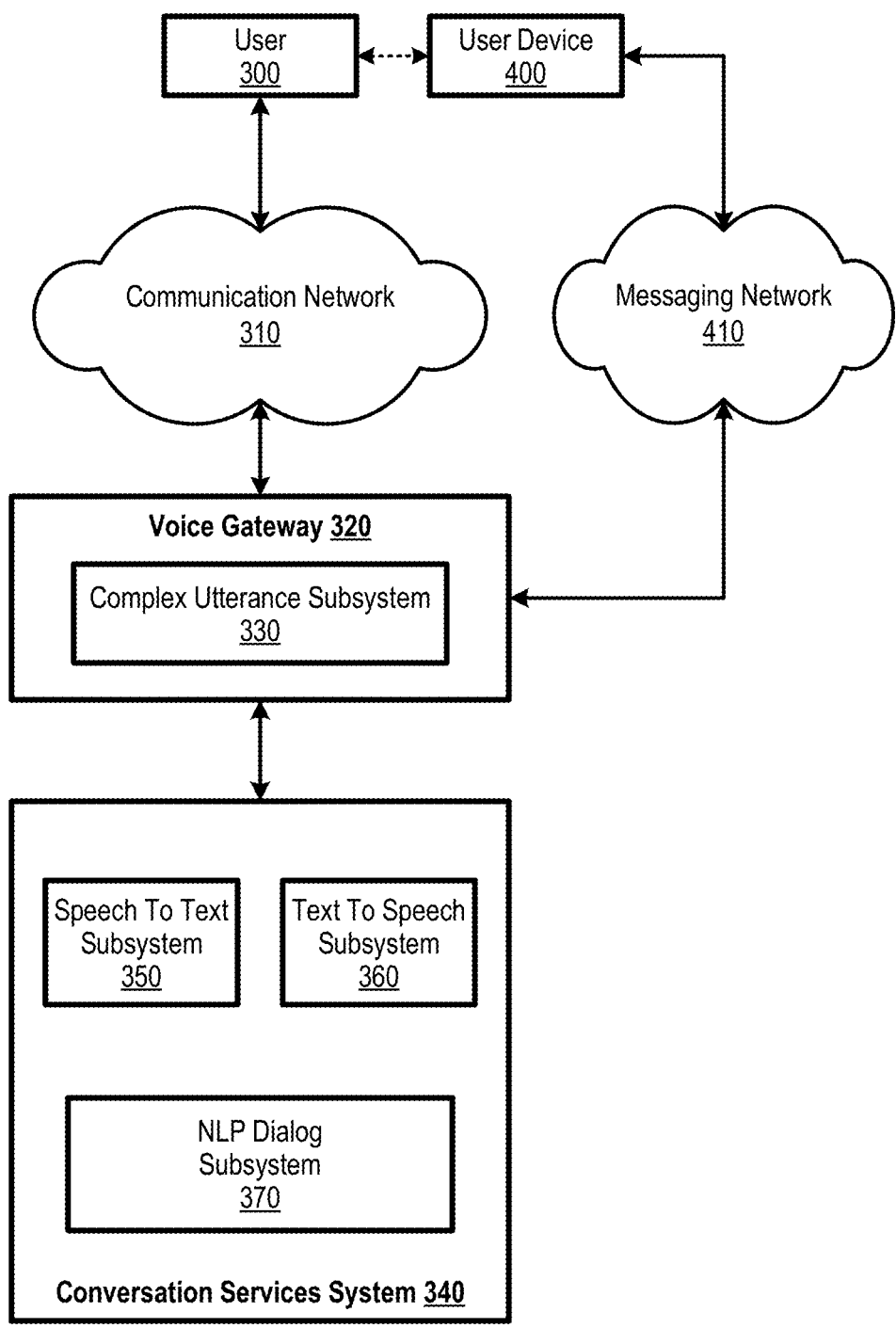
FIG. 4 is an exemplary diagram depicting a voice gateway establishing a messaging channel with a user when user data is not able to be accurately collected over a voice channel.

FIG. 4 is an exemplary diagram depicting a voice gateway establishing a messaging channel with a user when user data is not able to be accurately collected over a voice channel. As discussed above, complex utterance subsystem 330 orchestrates utterances from user 300 and exchanges the utterances with conversation services system 340. At times, conversation services system 340 is not able to receive a complete set of user data, such as when user 300 has a heavy accent, the voice channel is noisy, or too long of user-initiated pauses. In addition, conversation services system 340 may have difficulty evaluating complex data such as with complex last names or street names. In these situations, voice gateway 320 and conversation services system 340 establish a messaging channel to collect the user data over the messaging channel.

When instructed by conversation services system 340, voice gateway 320 establishes the messaging channel over messaging network 410 and sends a request over the messaging channel to user device 400. In one embodiment, voice gateway 320 instructs user 300 over the voice channel via an audio message to check for the message on user device 400. In turn, user 300 provides the requested information via user device 400 to voice gateway 320 over the messaging channel, such as a complete social security number or a remaining portion of the social security number. In turn, conversation services system 340 determines if additional user data is required (e.g., the user's birth day) and sends a request to voice gateway 320 accordingly. In one embodiment, voice gateway 320 and conversation services system 340 make up a complete system that can initiate a messaging channel where voice gateway 320 orchestrates the entire flow for the overall system.

Figure 5:
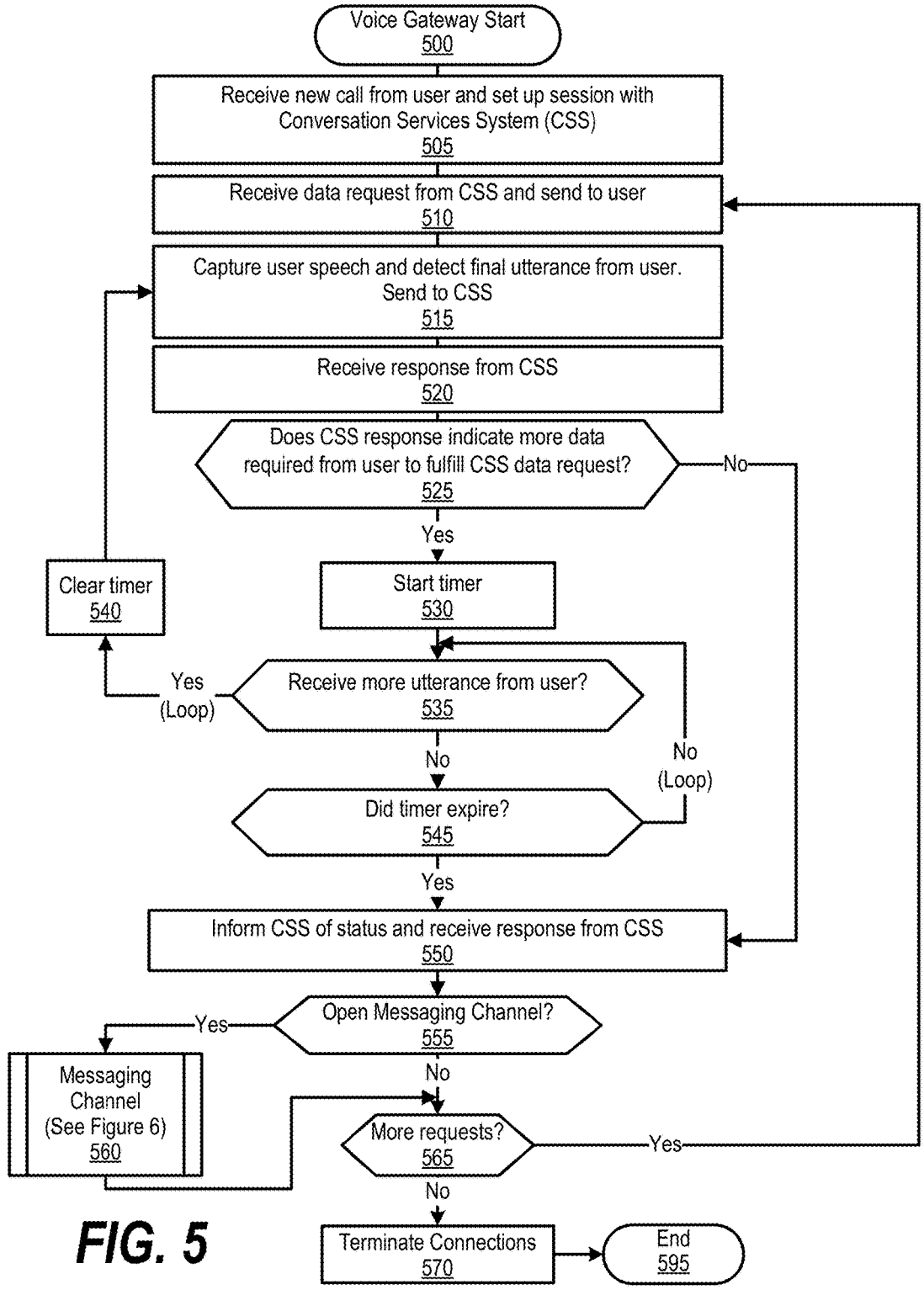
FIG. 5 is an exemplary diagram depicting steps taken to collect user data through complex utterances and a messaging channel.

FIG. 5 is an exemplary diagram depicting steps taken to collect user data through complex utterances and a messaging channel. FIG. 5 processing commences at 500 whereupon, at step 505, the process receives a new call from user 300 and sets up a call session with Conversation Services System (CSS) 340. At step 510, the process receives a request in audio format from CSS 340 and sends the request in audio format to user 300, such as "Please provide your social security number."

At step 515, the process begins capturing user speech and then detects a pause from the user, indicating a final utterance. For example, the user may say "1234 . . . " The process sends the utterance to CSS 340 for processing. At step 520, the process receives a response from CSS 340, and determines as to whether CSS 340 requires additional user data from the user to fulfill the initial data request (decision 525). Continuing with the example above, CSS 340 requires nine digits for a social security number and the user may have only provided the first four digits.

If CSS 340 does require more data to fulfill the data request, then decision 525 branches to the "No" branch bypassing steps 530-545. On the other hand, if CSS 340 requires more data to fulfill the data request, then decision 525 branches to the "Yes" branch. At step 530, the process starts a countdown timer to wait for user 300 to provide additional data. The process monitors the voice channel and determines as to whether the user provides more utterance (decision 535). If the user provides more utterance, then decision 535 branches to the 'yes' branch which loops back to clear the timer (step 540) and process the additional utterance.

On the other hand, if the user has not provided more utterance, decision 535 branches to the "No" branch, whereupon the process determines as to whether the timer expired (decision 545). If the timer did not expire, then decision 545 branches to the "No" branch which loops back to monitor user utterances. This looping continues until the process does not receive more user utterances and the timer expires, at which point decision 545 branches to the "Yes" branch exiting the loop.

At step 550, the process informs CSS 340 of the status and receives a response from CSS 340. The process determines as to whether CSS 340 requests a messaging channel be opened, such as when CSS 340 did not receive a complete set of user data (decision 555). If CSS 340 requests a messaging channel be opened, then decision 555 branches to the 'yes' branch whereupon, at predefined process 560, the process opens a messaging channel and communicates with the user's digital device to request and receive data (see FIG. 6 and corresponding text for processing details).

On the other hand, if CSS 340 did not request a messaging channel to be opened, decision 555 branches to the "No" branch, whereupon the process determines as to whether CSS 340 has more data requests, such as "please provide your birth date" (decision 565). If CSS 340 has more data requests, then decision 565 branches to the 'yes' branch which loops back to send an additional data request to the user, which may be over the voice channel and/or the messaging channel. This looping continues until CSS 340 does not require any more data from user 300, at which point decision 565 branches to the 'no' branch. At step 570, the process terminates the voice channel and messaging channel (if applicable) and FIG. 5 processing thereafter ends at 595.

Figure 6:
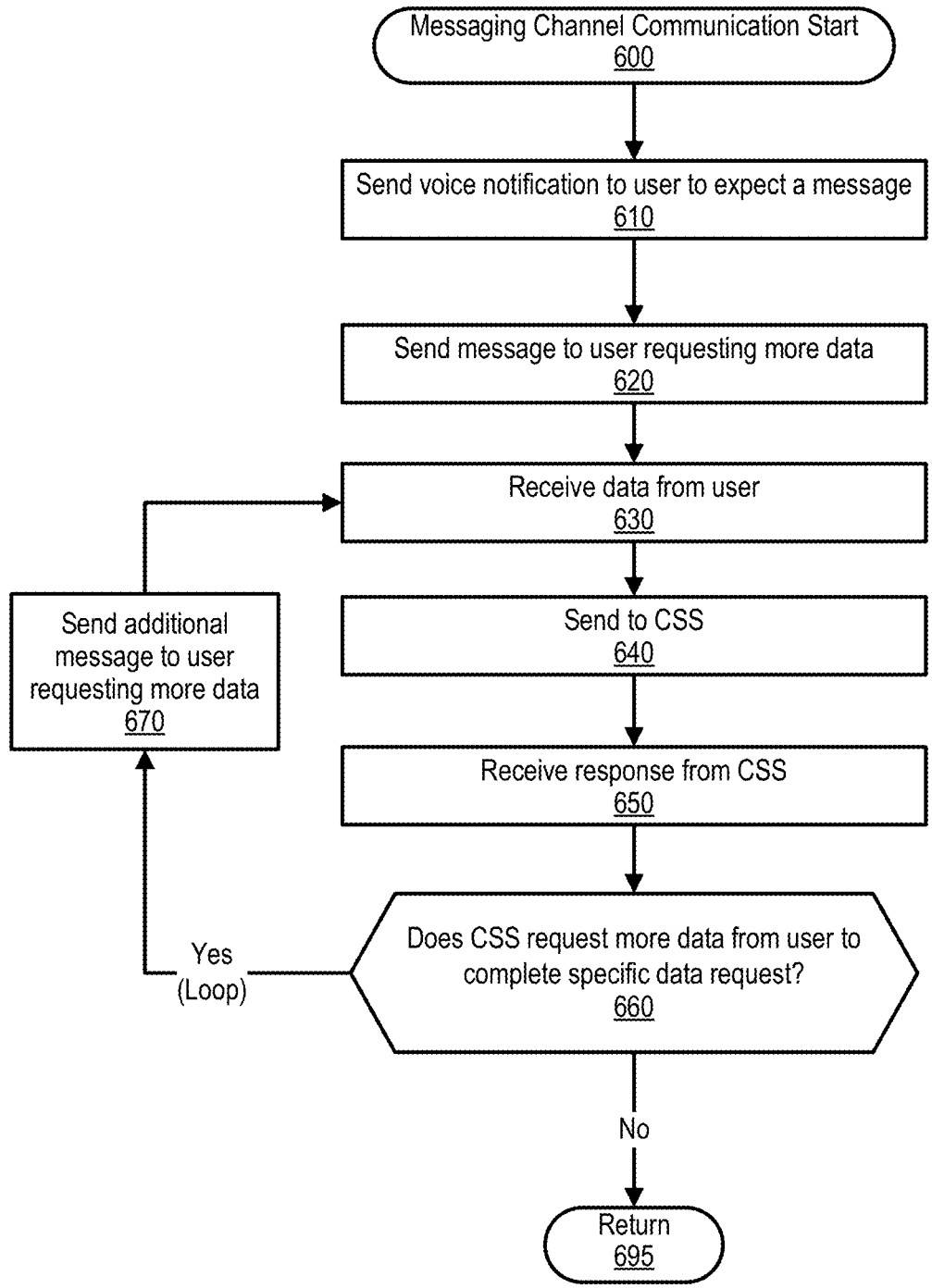
FIG. 6 is an exemplary diagram depicting steps taken to establish a messaging channel and collect user data over the messaging channel.

FIG. 6 is an exemplary diagram depicting steps taken to establish a messaging channel and collect user data over the messaging channel. FIG. 6 processing commences at 600 whereupon, at step 610, the process sends a voice notification to the user to check the user's electronic device 400 for a message. At step 620, the process sends a message to user device 400 over the messaging channel requesting additional data that was not provided over the voice channel. For example, the process may send a message such as "1234— was received over the voice channel, please provide your remaining social security number data". In one embodiment, the process requests the complete set of user data, regardless of what was previously received, such as "Please provide your social security number."

At step 630, the process receives data from user device 400 over the messaging channel, and sends the data to CSS 340 at step 640. At step 650, the process receives a response from CSS 340 and determines as to whether CSS 340 requests more data from the user to complete the specific data request (decision 660). Using the example above, the user may just provide "56" but not provide the user's last four digits of the user's social security number.

If CSS 340 requests more data from the user to complete the specific data request, then decision 660 branches to the 'yes' branch which loops back to send another request to user device 400 over the messaging channel for additional data (step 670). In one embodiment, the process may also request more data from the user over the voice channel. This looping continues until CSS 340 does not require more data to complete the specific data request, at which point decision 660 branches to the 'no' branch exiting the loop. FIG. 6 processing thereafter returns to the calling routine (see FIG. 5) at 695.

Figure 7:
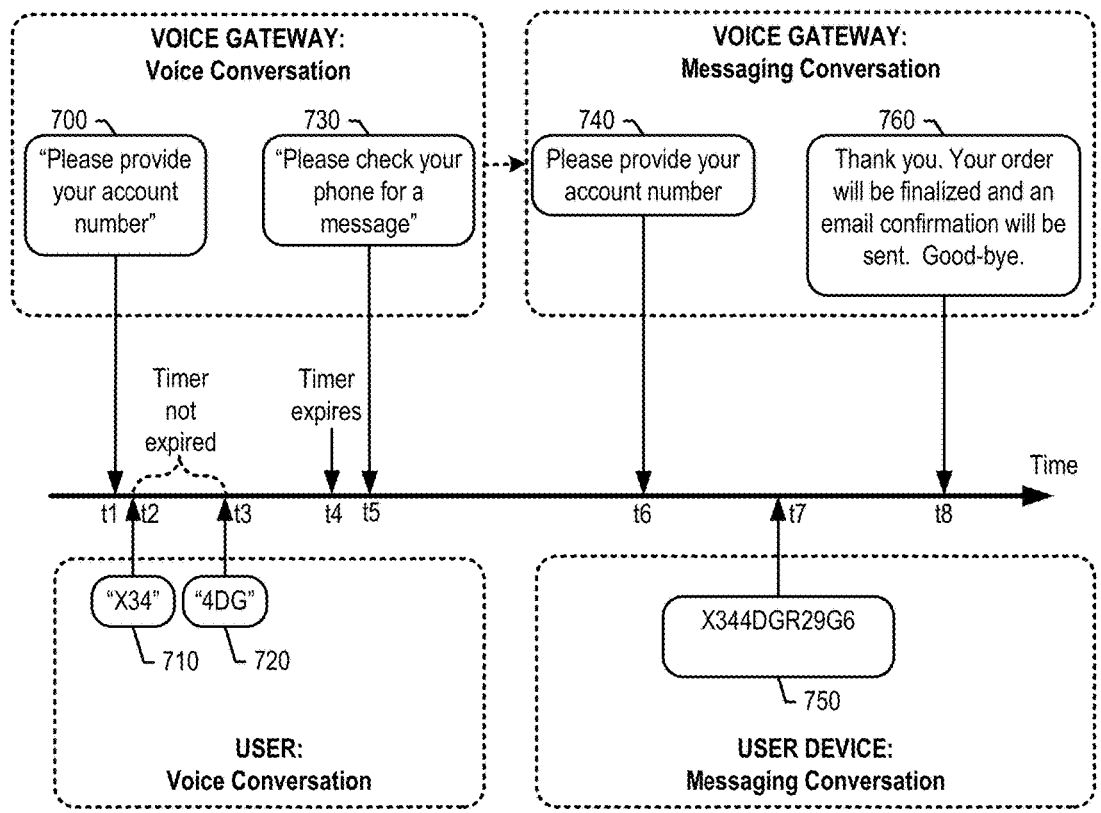
FIG. 7 is an exemplary diagram depicting a timeline of a user interacting with the information handling system over a voice channel and messaging channel.

FIG. 7 is an exemplary diagram depicting a timeline of a user interacting with the information handling system over a voice channel and messaging channel. At time t1, voice gateway 320 sends audio request 700 to user 300 requesting user 300's account number. At time t2, user 300 begins to provide the account number (710) and then pauses. Voice gateway 320 sets a timer and waits for user 300 to continue speaking. At time t3, which is before the timer expires, user 300 starts to provide additional alphanumeric characters (720) and voice gateway 320 resets the timer. User 300 pauses again after "4DG," and voice gateway 320 starts the timer again.

At time t4, the timer expires. As such, conversation services system 340 instructs voice gateway 320 to open a messaging channel. In one embodiment, as described herein, voice gateway 320 may establish a messaging channel when the voice channel is noisy or because the user's dialect is not understood by the CSS (340).

Voice gateway 320 sends audio request 730 over the voice channel at time t5, instructing user 300 to check user device 400 for a message. Voice gateway 320 sends message 740 to user device 410 at time t6, and user 300 responds via user device 410 with message 750 at time t7. At time t8, conversation services system 340 determines that message 750 completes the user data set request and instructs voice gateway 320 to send message 760 to user 300 over the messaging channel. In addition, in one embodiment, voice gateway 320 also sends message 760 in audio format to user 300 over the voice channel.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
one or more processors;
a memory coupled to at least one of the processors; and
a set of computer program instructions stored in the memory and executed by at least one of the processors in order to perform actions of:
sending a first request to a user over a voice channel through a first communication network, wherein the first request is in an audio format and requests a user data set from the user;
receiving one or more utterances from the user over the voice channel in response to sending the first request; and
in response to determining that the one or more utterances comprise a first portion of the user data set that fails to complete the user data set:
establishing a messaging channel with the user through a second communication network, wherein the messaging channel is an end-to-end digital data channel between the information handing system and a user device utilized by the user; and
sending a second request to the user device over the messaging channel requesting additional data to complete the user data set, wherein the second request is in a digital data format.

2. The information handling system of claim 1 wherein at least one of the one or more processors perform additional actions comprising:
receiving a second portion of the user data set from the user over the messaging channel in response to sending the second request;
determining that the first portion of the user data set and the second portion of the user data set fails to complete the user data set; and
sending a third request to the user over the messaging channel to provide a third portion of the user data set.

3. The information handling system of claim 2 wherein both the voice channel and the messaging channel are concurrently active, and wherein at least one of the one or more processors perform additional actions comprising:
sending a fourth request to the user over the voice channel to provide the third portion of the user data set, wherein the fourth request is in the audio format and is sent concurrently with the third request.

4. The information handling system of claim 1 wherein at least one of the one or more processors perform additional actions comprising:
- capturing a first speech pattern on the voice channel until a first pause is detected;
- storing the first speech pattern as a first one of the one or more utterances;
- determining that the first utterance includes the first portion of data that fails to complete the user data set;
- waiting to receive a second speech pattern for a predetermined amount of time in response to the determining that the first utterance includes the first portion of data that fails to complete the user data set; and
- establishing the messaging channel in response to determining that the second speech pattern was not received within the predetermined amount of time.

5. The information handling system of claim 1 wherein at least one of the one or more processors perform additional actions comprising:
- sending a second request to the user over the voice channel in response to the user providing the additional data to complete the user data set, wherein the second request is in the audio format and requests a different user data set from the user; and
- receiving the different user data set from the user over the messaging channel.

6. The information handling system of claim 1 wherein at least one of the one or more processors perform additional actions comprising:
- in response to determining that the one or more utterances correspond to the first portion of the user data, informing the user over the voice channel of the message being sent over the messaging channel.

7. The information handling system of claim 1 wherein each of the one or more utterances is an uninterrupted speech pattern ending with a pause.

8. A computer program product stored in a computer readable storage medium, comprising computer program code that, when executed by an information handling system, causes the information handling system to perform actions comprising:
- sending a first request to a user over a voice channel through a first communication network, wherein the first request is in an audio format and requests a user data set from the user;
- receiving one or more utterances from the user over the voice channel in response to sending the first request; and
- in response to determining that the one or more utterances comprise a first portion of the user data set that fails to complete the user data set:
  - establishing a messaging channel with the user through a second communication network, wherein the messaging channel is an end-to-end digital data channel between the information handing system and a user device utilized by the user; and
  - sending a second request to the user device over the messaging channel requesting additional data to complete the user data set, wherein the second request is in a digital data format.

9. The computer program product of claim 8 wherein the information handling system performs additional actions comprising:
- receiving a second portion of the user data set from the user over the messaging channel in response to sending the second request;
- determining that the first portion of the user data set and the second portion of the user data set fails to complete the user data set; and
- sending a third request to the user over the messaging channel to provide a third portion of the user data set.

10. The computer program product of claim 9 wherein both the voice channel and the messaging channel are concurrently active, and wherein the information handling system performs additional actions comprising:
- sending a fourth request to the user over the voice channel to provide the third portion of the user data set, wherein the fourth request is in the audio format and is sent concurrently with the third request.

11. The computer program product of claim 8 wherein the information handling system performs additional actions comprising:
- capturing a first speech pattern on the voice channel until a first pause is detected;
- storing the first speech pattern as a first one of the one or more utterances;
- determining that the first utterance includes the first portion of data that fails to complete the user data set;
- waiting to receive a second speech pattern for a predetermined amount of time in response to the determining that the first utterance includes the first portion of data that fails to complete the user data set; and
- establishing the messaging channel in response to determining that the second speech pattern was not received within the predetermined amount of time.

12. The computer program product of claim 8 wherein the information handling system performs additional actions comprising:
- sending a second request to the user over the voice channel in response to the user providing the additional data to complete the user data set, wherein the second request is in the audio format and requests a different user data set from the user; and
- receiving the different user data set from the user over the messaging channel.

13. The computer program product of claim 8 wherein the information handling system performs additional actions comprising:
- in response to determining that the one or more utterances correspond to the first portion of the user data, informing the user over the voice channel of the message being sent over the messaging channel.

* * * * *